United States Patent
Brock et al.

[15] 3,663,344
[45] May 16, 1972

[54] ORTHOTROPIC FIBER-REINFORCED THERMOPLASTIC FILM AND METHOD OF MANUFACTURE

[72] Inventors: Robert J. Brock, Appleton; Paul B. Hansen, Neenah, both of Wis.

[73] Assignee: Kimberly-Clark Corporation, Neenah, Wis.

[22] Filed: Dec. 31, 1970

[21] Appl. No.: 103,150

[52] U.S. Cl. ............................161/59, 156/177, 156/178, 156/220, 156/249, 156/289, 156/291, 156/436, 161/57, 161/148, 161/156, 161/167, 161/170
[51] Int. Cl. .................B32b 5/12, B32b 27/04, B32b 27/12
[58] Field of Search ...................161/55, 57–60, 161/140–144, 146, 148, 156, 170, 167; 156/177, 178, 249, 289, 291, 220, 436, 439; 264/136, 137, 257, 258, 271

[56] References Cited

UNITED STATES PATENTS

| | | | |
|---|---|---|---|
| 2,781,287 | 2/1957 | Gustus et al. | 161/57 |
| 3,327,708 | 6/1967 | Sokolowski | 161/148 X |
| 3,553,064 | 1/1971 | Wideman | 161/148 X |

*Primary Examiner*—William A. Powell
*Attorney*—Walfe, Hubbard, Leydig, Voit & Osann

[57] ABSTRACT

A film-staple fiber composite, and method of making same, provides an integral product of satisfactory tensile strength yet with low tear resistance. Cross-laid fiber webs impart tensile strength to the film and the fiber webs are placed in close proximity to each other to develop the low tear resistance.

8 Claims, 7 Drawing Figures

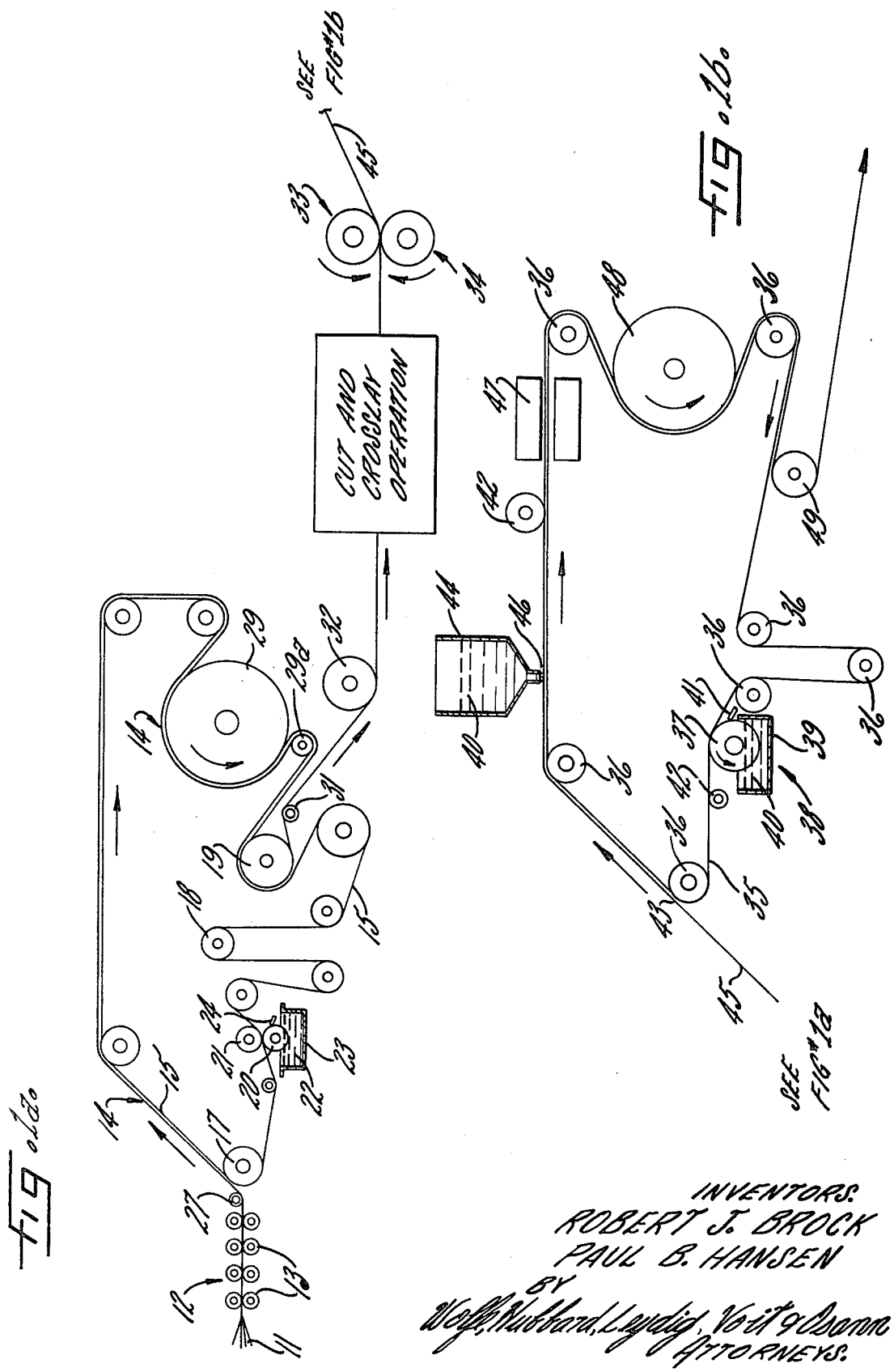

Patented May 16, 1972
3,663,344
2 Sheets-Sheet 2
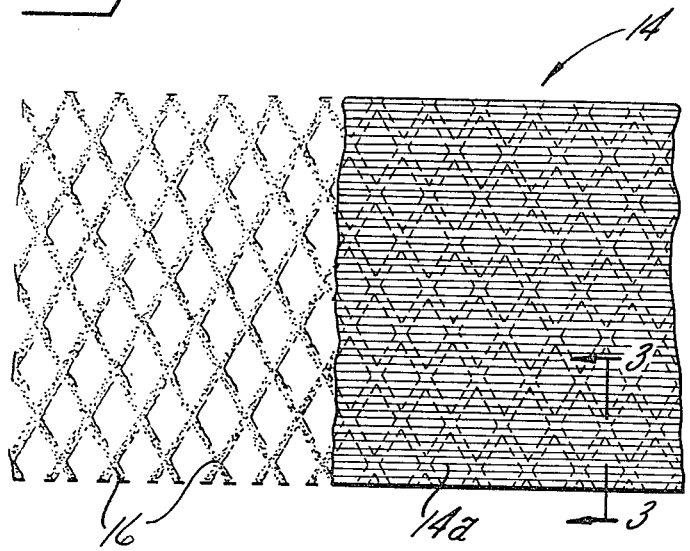
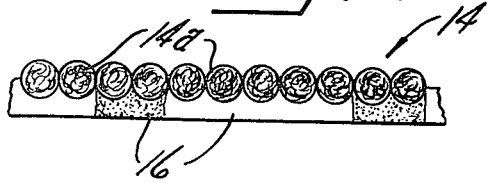
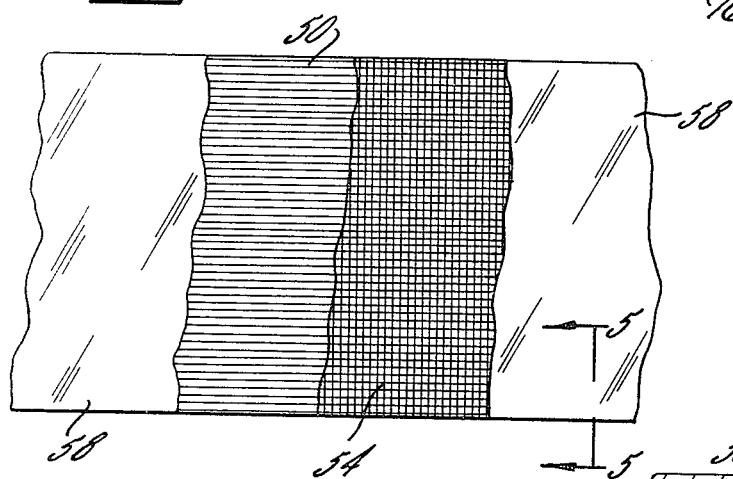
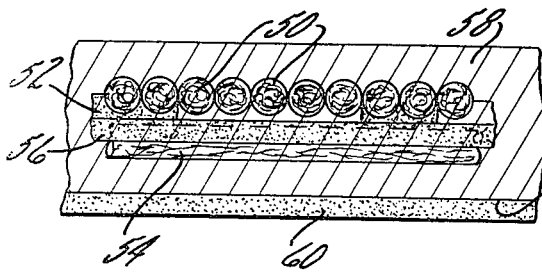
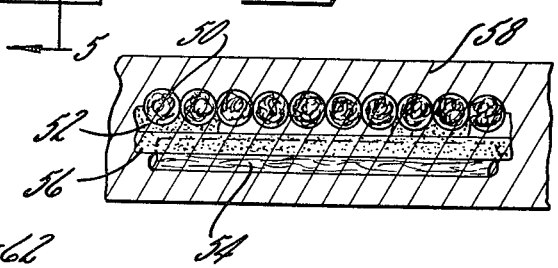
INVENTORS.
ROBERT J. BROCK
PAUL B. HANSEN
BY
Wolff, Hubbard, Leydig, Voit & Osann
ATTORNEYS

ORTHOTROPIC FIBER-REINFORCED THERMOPLASTIC FILM AND METHOD OF MANUFACTURE

This invention relates generally to film-fiber composites and, more particularly, to film-staple fiber composites characterized by satisfactory tensile strength yet possessing low tear resistance.

A variety of applications require an economical, strong, flexible material which can be easily formed, simply by tearing, into rectangular strips of any desired dimensions. One specific application would be pressure sensitive tapes. With a pressure sensitive adhesive applied to one side of the material supplied in roll or sheet form, the user could easily prepare, at the point of use, strips dimensioned to fit a particular need.

No prior materials have provided all the requisite properties. The chief difficulties have been to combine all of the listed desirable characteristics into one material. For example, some film-fiber composites have frequently resulted in relatively low strength to weight ratios. Other materials have adequate strength characteristics in only one direction. Where the strength has been suitably orthotropic or isotropic, the composites have been relatively thick and non-uniform. Furthermore, adequate strength has often been accompanied by significantly increased stiffness. These prior procedures were also not readily adaptable to the handling of very lightweight webs in an economical fashion.

Recently, a material has been disclosed which possesses many of the desired properties of our composition. This is disclosed in copending Robinson U.S. application, Ser. No. 729,585, filed May 16, 1968, assigned to the assignee of the present invention. The application discloses a reinforced thermoplastic film which is strong, flexible, thin, relatively lightweight and inexpensive.

While generally similar to the film fiber composites of the present invention and possessing strength characteristics making it highly suitable for a wide variety of applications, the prior material has relatively high tear strength. In addition, if two sheets are cross laid to provide good orthotropic strength properties, tearing the material tends to result in delamination.

An object of the present invention is to provide a flexible material combining low tear resistance with satisfactory tensile strength properties. A related and more specific object is to provide a film-staple fiber composite characterized by the hereinbefore-identified properties.

A further object is to provide an economical method for forming a film-fiber composite having the herein-identified properties.

Another object includes the provision of a composite of the above-described type having a lightweight construction with a high strength-to-weight ratio.

A still further object provides a film-fiber composite which may readily be formed into strips by tearing without the formation of irregular edges.

Other objects and advantages of the invention will be apparent from the following detailed description taken in connection with the accompanying drawings, in which:

FIG. 1a and 1b are schematic side elevations and illustrate one form of apparatus which may be employed to carry out the method of the present invention;

FIG. 2 is a fragmentary plan view of an illustrative web of base material, somewhat simplified and exaggerated for the sake of clarity of illustration, with portions broken away to expose the two layers;

FIG. 3 is a cross-sectional view taken substantially along lines 3—3 of FIG. 2 and further illustrating a base material which may be used to form the product of the present invention;

FIG. 4 is a fragmentary plan view, somewhat simplified and exaggerated for clarity of illustration and showing one embodiment of the product of the present invention, with portions broken away to expose the various layers;

FIG. 5 is a cross-sectional view taken substantially along lines 5—5 of FIG. 4 and further illustrating the embodiment of FIG. 4, and FIG. 6 is a cross-sectional view similar to FIG. 5, except showing a pressure sensitive tape utilizing the fiber-film composite of the present invention.

While the invention will be described in connection with a preferred embodiment, it will be understood that we do not intend to limit the invention to that embodiment. On the contrary, we intend to cover all alternative modifications and equivalents as may be included within the spirit and scope of the invention as defined by the appended claims.

Broadly stated, a film-fiber composite is made, according to the present invention, by forming a fiber laminate comprising a fibrous web with the fibers predominately oriented in one direction embedded in a discontinuous or open pattern of an adhesive backing, cross laying two such fiber laminates with the backings in face-to-face contact so as to bring the crossed sets of fibers into the closest possible proximity, bonding the cross-laid fiber laminates together to form a bonded assembly and then enveloping the bonded assembly in a thin thermoplastic film to provide a unitary product capable of being easily formed into strips of the desired dimensions merely by tearing along the two directions of fiber orientation.

Turning now to the drawings, FIGS. 1a and 1b schematically illustrate apparatus for forming the film-fiber composite of the present invention. FIG. 1a illustrates forming a fiber laminate and crosslyaing and bonding two of such laminates, and FIG. 1b shows one means for forming the crosslaid, bonded fiber laminates into the film fiber composite of this invention. The forming of suitable fiber laminates is shown in copending applications Saunders et al., Ser. No. 498,929, filed Oct. 20, 1965 and Stumpf et al., Ser. No. 553,483, filed May 27, 1966, now U.S. Pat. No. 3,553,065.

Turning first to FIG. 1a, multiple slivers 10 of textile fibers are drawn from their respective supply cans (not shown) into a draw frame 12 which comprises a series of pairs of grooved rolls 13, the rows of each pair being driven by appropriate gearing well known in the art, at a peripheral rate of speed slightly faster than the rate of operation of the preceeding pair. As the juxtaposed slivers pass through draw frame 12, the individual fibers are drafted and spread out to form a flat striated web 14 of substantially aligned fibers. Web 14 is then embedded in a discontinuous or open pattern of adhesive carried by a supporting conveyor sheet 15 as will hereinafter be described.

Different procedures may be used in preparing the base web 14. For example, textile length fibers may be processed through conventional cotton card machinery to produce a carded web for the base web. In such a carded web, 50 percent –70 percent of the fibers may be orientated substantially parallel with the machine direction; it has been found, however, in a preferred embodiment, that a product having satisfactory strength with low tear resistance will be obtained with the method of the present invention by using base webs having a higher percentage of the fibers aligned with the machine direction, such as a highly drafted web in which, as a result of the drafting process, 80 percent –95 percent of the fibers may be aligned with the machine direction.

In this embodiment, the conveyor sheet 15 comprises an endless conveyor belt treated on at least its upper surface with a release agent. One example of such a belt comprises woven glass fiber with a surface coating of polytetrafluoroethylene resin. Other release coatings are well known, and comprise such materials as silicones, fatty acid metal complexes, certain acrylic polymers, and he like. Heat-resistant films or thin metal sheets treated with release agents may also be used as the carrier sheet.

Prior to the time the web 14 is picked up by the belt 15, the latter has imprinted on its release-treated surface a pattern of a flexible adhesive such as is shown at 16 in FIG. 2. It is understood that this material is actually on the underside of belt 15 which becomes the upper surface after passing around roll 17 whereby the adhesive pattern 16 directly contacts the fiber web 14. The diamond pattern shown as being visible in FIG. 2 is only for illustrative purposes.

The belt 15 is fed around roll 17 at a speed slightly in excess of the delivery speed of the final pair of rolls 13 in order to maintain web 14 under slight tension whereby the individual highly drafted fibers are retained in their aligned and tensioned condition. Drive rolls 18, 19 are rotated to drive belt 15 at a speed sufficient to maintain the proper tension on the web 14.

In the method shown for applying the adhesive material, the belt 15 is fed through a nip formed between a printing roll 20 and a back-up roll 21 maintained in very light pressure engagement therewith. The surface of printing roll 20 is provided with an intaglio pattern which picks up adhesive material 22 from dip pan 23. Part of this material thus applied is removed by a doctor blade 24 leaving only the intaglio patterned surface filled. The printing roll 20 then transfers this metered amount of adhesive material in a preselected pattern to the underside of release coated belt 15.

Since the surface of belt 15 is treated with a release coating, the adhesive material remains substantially on the surface with no penetration therein and is preferably in a somewhat tacky condition. The printed belt is drawn from the printing nip around roll 17 positioned closely adjacent the output end of draw frame 12, and, as stated hereinbefore, at a speed slightly in excess of the delivery speed of the last two rolls in the draw frame. The web 14 emerging from the draw frame 12 is deposited on the tacky adhesive material 16 on belt 15 and held in tensioned engagement therewith by the adhesive material and the above-mentioned speed differential. This continuous tension prevents the fibers in the web from losing their high-drafted and aligned condition. The fibers from the draw frame 12 pass under bar 27 before being deposited on the belt 15.

Following deposit of web 14 on the adhesive printed belt 15, the belt is drawn around a heated drum 29 where fusing and curing of the adhesive material is substantially completed while the web 14 is maintained in firm contact therewith to bond the individual fibers. To insure effective heating and fusing of the adhesive material, it is desirable that travel of the combined belt and web be around a substantial portion of the drum 29. In the illustrated embodiment, a fly roll 29a is disposed to provide wrap for the combined belt and web as they travel around the drum 29 to insure complete embedment of the fibers in the adhesive material. The fibers of the web 14 are thus bonded together while retaining their highly drafted and substantially aligned condition in the particular pattern in which were deposited on the open pattern of adhesive material 16 printed on the belt 15.

After leaving the fly roll 29a, the combined web 14 and belt 15 are preferably passed over the drive roll 19 which also serves as a cooling drum, to cure and set the adhesive material. The bonded web 14 is stripped from the release coated surface of the belt 15 by the guide roll 31 as the web leaves the cooling drum 19.

As shown in FIGS. 2 and 3, the thus-formed fiber laminates comprise a fibrous web 14, the fibers 14a (spaced apart for clarity, in practice being close to one another), being predominately oriented in one direction are embedded in an adhesive backing consisting of the open diamond pattern of adhesive 16.

The staple fibers employed should preferably be of a denier in the range of from about 0.5 to 6 and have a length of from about ½ to about 3 inches. Any type of fibers may be employed, but it is preferred to use synthetic materials such as viscose, acetate rayon, nylons, polyesters, acrylonitriles and the like. So that the fibers retain their integrity in the processing, the softening point must be higher than the fusion point of the adhesive material that is used.

The weight of the fibrous web may vary within wide limits depending upon the requisite strength and the like for the intended application. However, it has been found satisfactory to utilize webs having from about 6 to about 20 gms./yd.$^2$. The amount of adhesive may vary within wide limits but should be present in sufficient quantity to accomplish the function of bonding the fibers together to form a fiber laminate with sufficient integrity for processing in accordance with the present invention. The adhesive weight should increase with increasing weight of the fibrous web and is desirably present in a 1:1 ratio. It is preferred to use a minimum amount of adhesive so that the crosslaid fiber laminates, formed as will hereinafter be described, have the fibrous webs as close together as possible, consistent, of course, with the requirements of the adhesive as hereinbefore noted. The pattern for the adhesive may be any open or discontinuous one with the principal requirement being that the pattern impart integrity to the fibrous web.

The type of adhesive employed is not critical so long as it can achieve its function of providing integrity for the web and is compatible with the enveloping film as will hereinafter be explained. It is preferred to utilize thermoplastic film-forming adhesive because of the resulting flexibility of the fiber laminate and the film-fiber composite of the present invention. It is particularly preferred to employ plastisols such as, for example, vinyl chloride polymers or copolymers of vinyl chloride with other vinyl resins, plasticized by organic phthalates, sebacates, adipates or the like. Polyvinyl resins per se, plasticized or unplasticized, such as polyvinyl acetate may also be used. Other flexible adhesives which may be advantageously used include acrylic resins such as the alkyl acrylates and butadiene resins such as butadiene-styrene and butadiene acrylonitriles.

At least two fiber laminates are then crosslaid and bonded together to form a bonded assembly which, as will be later described in detail, is enveloped in a thin thermoplastic film to form the film-fiber composite of the present invention. To this end, as schematically shown in FIG. 1a, the fiber laminate is passed over drive roll 32; and two such laminates are then crosslaid to form a two-ply assembly with the adhesive backings being in face-to-face contact. The crosslaying is accomplished so that the aligned fibers in one fiber laminate are essentially perpendicular to the aligned fibers of the other laminate. The specific method and means used for crosslaying forms no part of this invention; and several means are well known, one suitable apparatus being shown in U.S. Pat. No. 2,841,202. The crosslaid fiber laminates are then bonded together by passing them through the nip formed by rolls 33 and 34, heated to a temperature sufficient to activate the particular adhesive used.

In order to provide the film-fiber composite of the present invention, the thus-formed crosslaid bonded assembly is enveloped or encased with a thin thermoplastic film. As shown in FIG. 1b, an endless belt 35 of woven glass with a continuous smooth release surface (coated with a release agent such as tetrafluoroethylene as with belt 15) is trained over rollers 36 for movement in the direction indicated by the arrows and is driven by any suitable mechanism (not shown). The belt 35, in its traverse over the rollers 36 contacts an applicator roll 37 at a station generally indicated at 38. The applicator station 38 includes the applicator roll 37, pan 39 containing a thermoplastic film-forming solution 40, and a wiper or doctor blade 41, the direction of the rotation of the roll 37 being indicated by the arrow. Immediately adjacent the applicator station 38 and in the direction of belt travel is a metering doctor rod 42 which functions to smooth onto the belt 35 the thermoplastic film of material conveyed to the belt by the applicator roll 37. Most suitably, the rod 42 is a Mayer rod rotating in the same direction as the belt travel and functioning to limit the thickness of the film deposited on the belt as well as to smooth the film.

The bonded assembly 45 is laid into the substantially uniform continuous, smooth thermoplastic film resting on belt 35 as indicated at 43. Additional uniform, continuous, smooth thermoplastic material 40, is subsequently laid onto the top of the immersed crosslaid bonded assembly 45 from container 44 at 46. In order to obtain a uniform, continuous upper surface, a second Mayer rod 42 is used. The film compositions below and above the bonded assembly completely envelop the crosslaid bonded assembly so as to form a uniform, continuous and smooth film surface thereover. The resulting film covered bonded assembly is cured by heating in oven 47 thereby solidifying the film to fixedly envelop the bonded assembly and thereby forming a unitary product. This product is then passed over drive roll 48 which also serves as a cooling drum to cure and set the thermoplastic film-forming material and is then stripped from release-coated surface 35 by guide roll 49.

The particular thermoplastic material employed is not critical, and the weight ratio of the film to the fibrous web is also not critical. It has been generally found suitable to maintain a thermoplastic film (total weight of film and adhesive) to fibrous web (weight of fibers only) ratio of from about 3 to 10, with 3 to 5 being preferred.

While, as noted, any thermoplastic film-forming material can be used, it has been found desirable to use plasticized vinyl chloride polymers and copolymers of vinyl chloride with other vinyl resins. It should be appreciated, of course, that the thermoplastic material used for the film and the adhesive material used for the backing should be compatible with each other so the composite product will not have strength deficiencies. Indeed, to obtain all of the advantages of the present invention, it is desirable to employ the same material for both the backing and the film, i.e. — polyvinyl chloride.

The film which encases the fiber webs may be translucent or semi-transparent, thus permitting the passage of light, or may be suitably pigmented to provide for film opacity, printability and color; also the film may be embossed without significant fiber disturbance to provide surfaces attractive to the eye and hand.

As seen in FIGS. 4 and 5, the film-fiber composite of the present invention comprises one fiber laminate consisting of a drawn web 50 with an adhesive backing 52. Crosslaid thereto is a second fiber laminate including a drawn web 54 with an adhesive backing 56. The two fiber laminates have been bonded together with backings in contact with each other and the fiber laminate bonded assembly is enveloped in a thermoplastic film 58. This film-fiber composite has satisfactory strength in the orthotropic directions (i.e. - in the directions of orientation of the two fibrous webs) and yet is characterized by low tear resistance.

It should be appreciated that the weight of the fibrous web need not be the same for both fiber laminates. The particular basis weights that are employed are dependent upon the strength and tear requirements of the contemplated use. Thus, for a tape application, it may be necessary to provide increased strength in the machine direction but similar strength in the cross direction is unnecessary. The film-fiber composite would then be prepared with a higher basis weight fibrous web in the MD direction than would be used in the CD. It should be appreciated that the higher basis weight MD web would increase resistance to tearing in the CD direction somewhat; but, within the weight limitations hereinbefore set forth, either MD or CD tearing can be readily accomplished.

FIG. 6 illustrates the film-fiber composite of the present invention with a pressure sensitive adhesive applied to one surface. As shown, a pressure sensitive adhesive layer 60 is affixed to the surface 62 of thermoplastic film 58. This embodiment may be advantageously used as a pressure sensitive tape. It should be appreciated that the particular pressure sensitive adhesive used is not critical and any of the several known materials may be employed.

The bonded assembly shown in the hereinbefore described Robinson application comprises two cross-laid plies comprising film bodies having fibers distributed therein. This crosslaid, reinforced film product has excellent orthotropic tensile strength but has a very high tear resistance and, upon tearing, after exerting substantial force may tend to delaminate. On the other hand, the product formed in accordance with our invention while having the desired tensile strength, also has a very low tear resistance with the direction of the tear being guided by the fibers. Without being limited to any theory, we offer the following as a possible explanation of the unique tearing characteristics of the present invention in contrast to the Robinson crosslaid reinforced film. In the material made in accordance with the present invention, when tearing takes place, stress is concentrated in one or a few fibers at the advancing point of rupture, so that not much force is required to propogate the tear. On the other hand, in the Robinson material, the stress will be distributed over many more fibers as well as more resin or film in the region of the advancing tear. Therefore, the force required to propogate the tear would be greater and there would appear to be a plane of weakness at the interface between the two individual film layers resulting in a tendency to delaminate upon tearing. In the film-fiber composite of the present invention, there is no such plane because the two layers of thermoplastic material interpenetrate in the unfused condition and cure as a single thermoplastic film.

In summary, the major reasons attributed to the unusual properties possessed by our bonded assembly include the fact that the fibers of one web lying in one direction are in close proximity to those lying in other direction or orientation. Also, the bonded crosslaid thermoplastic assembly cures as a single film due to the use of a discontinuous adhesive in bonding the individual fibrous webs so as to give them some integrity maintains pre-existing openings in the fiber web. These openings continue to exist even after two such webs are crosslaid and bonded to one another. As a result of such openings, the additional thermoplastic treatment allows the thermoplastic material to pass through the openings and interpenetrate the entire bonded assembly.

The product described may be made air permeable or provided with fine capillaries by subjecting it to a micropore embossing process; such provides for breathability in the film without materially sacrificing imperviousness. Additionally, the fabric may be improved as to hand and feel by simple embossing or conventional embossing equipment.

As an illustration of the present invention, the following single example is given. It should be appreciated that this example is illustrative and not limiting of our invention.

EXAMPLE

Two fiber laminates were made on apparatus similar to that shown in FIG. 1a, employing drawn webs of polyester staple fiber, having an average length of 3 inches, 2.25 denier/filament and the web having a basis weight of about 9.8 gms/yd.². The print pattern used was an interconnected diamond pattern as shown in FIG. 2 with tip-to-tip vertical and horizontal distances of one-fourth inch (the print roll cells were 0.025 inch wide and 0.007 inch deep). The adhesive had a weight of about 7.9 gms/yd.² and consisted of the following composition:

| | |
|---|---|
| "Geon 135" Polyvinyl chloride resin (B.F. Goodrich, Akron, Ohio) | 100 parts |
| Dioctyl phthalate | 60 parts |
| "Cab-O-Sil" Colloidal silica (Cabot Corp., Boston, Mass.) | 3 parts |

The adhesive was aged 3 days and mineral spirits added to bring the viscosity to 4,000 cp. The resulting fiber laminate had a basis weight of about 18 gms/yd.².

Two such fiber laminates were crosslaid with the adhesive backings in contact, and passed through the nip formed by a hard nylon top roll (at about 160° F.) and a chrome bottom roll (at about 290° F.). The nip pressure was about 120 PLI. The fiber laminates were brought in contact with the chrome roll for 5 seconds before entering the nip and were passed through the nip at about 8.5 ft/min.

A layer of the polyvinyl chloride adhesive formulation hereinbefore set forth was drawn on a polytetrafluoroethylene resin release surface using a No. 54 Mayer rod. The bonded crosslaid fiber laminate assembly was then laid into the film and additional film was smoothed over the top with a No. 7 Mayer rod.

The thus-formed film-fiber composite was cured in an oven for about 2 minutes at about 325° F. The total basis weight was about 209.58 gms./yd.² and the weight ratio of the polyvinyl chloride resin formulation (total of the film and the adhesive backing) to the fibrous webs was 4.81:1. The MD characteristics were: tensile — 21.3 lbs/in., 19 percent elongation and energy — 6.96 inch-lbs., and the CD characteristics were: tensile — 26.1 lbs/in., 19% elongation and energy — 7.62.

The tongue tear was determined using a 3 inch × 3 inch sample with a central 20 mm. slit on one edge (12 inch/min., gage length — ½ inch) and the MD tear was 1.67 lbs. and the CD was 1.27 lbs.

Thus, as has been seen, the present invention provides a novel material, and its method of manufacture, which has a superior strength to weight ratio yet has low resistance to tear so that strips of any desired dimensions may be readily formed. The film-fiber composite may be essentially transparent, translucent, opaque or colored by addition of pigments or dyes.

As used in the claims, the terms "cross-laying" and "cross-laid" are meant to define a configuration wherein the predominate directionality of the fibers in one fibrous web are disposed at substantially 90° with respect to the predominate directionality of the fibers in the other fibrous web.

We claim as our invention:

1. A method of forming a product exhibiting satisfactory tensile strength, high flexibility and low resistance to tear in the orthotropic directions comprising the steps of forming a fiber-film laminate comprising a discontinuous adhesive backing having a fibrous web, whose fibers are predominately oriented in one direction embedded therein, cross-laying at least two of such laminates with the backings in face-to-face contact, bonding the crosslaid backings together to form a bonded assembly and enveloping the bonded assembly in a thin thermoplastic film to provide a unitary product.

2. The method of claim 1 wherein the weight ratio of the thermoplastic film and the adhesive backings to the fibers is from about 3 to about 10:1.

3. The method of claim 1 where the staple length fibers are synthetic fibers of a denier of between 0.5 and 6 and the fibrous webs have a basis weight of from about 6 to about 20 grams/yd.².

4. The method of claim 1 where the thermoplastic film and the adhesives comprise a composition including polyvinyl chloride.

5. A method for producing a film-Fiber composite exhibiting the properties of satisfactory orthotropic tensile strength, high flexibility and low tearing resistance comprising the steps of imprinting a discontinuous adhesive pattern onto a temporary support having a release surface, embedding a fibrous web, whose fibers are predominately oriented in one direction, into the adhesive to form a fiber laminate with an adhesive backing, fusing and curing the adhesive, stripping the fiber laminate from the temporary support, cross-laying at least two fiber laminates and bonding them together and enveloping the bonded assembly with a continuous thermoplastic film.

6. A film-fiber composite characterized by satisfactory tensile strength, high flexibility and low resistance to tearing in the orthotropic directions comprising a first fiber laminate comprising a discontinuous adhesive backing having a fibrous web embedded therein, the fibers being predominately oriented in one direction, a second fiber laminate comprising a discontinuous adhesive backing having a fibrous web with the fibers being predominately oriented in one direction being crosslaid with respect to said first fiber laminate and being bonded thereto with the backings being in a face-to-face relationship and a thermoplastic film encasing the crosslaid fiber laminates.

7. The film-fiber composite of claim 6 wherein the fibers are staple length fibers and the webs each have a basis weight of from about 6 to about 20 gms/yd.² and the weight ratio of the thermoplastic film and the adhesive backings to the fibers is from about 3 to about 10:1.

8. The film-fiber composite of claim 6 wherein the thermoplastic film and the adhesives comprise a composition including polyvinyl chloride.

* * * * *